Jan. 10, 1928.
F. J. SCHMIDT, JR., ET AL
1,655,513
WINDSHIELD VISOR
Filed May 13, 1926
2 Sheets-Sheet 1
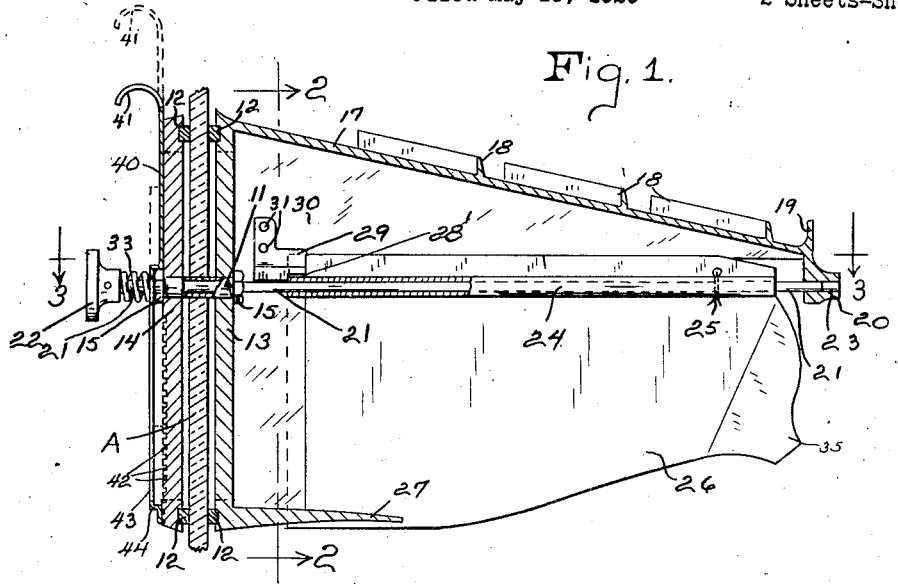
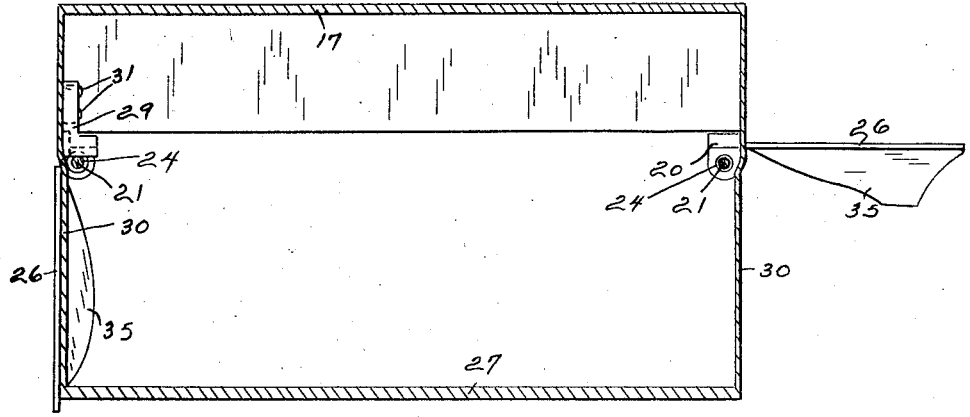
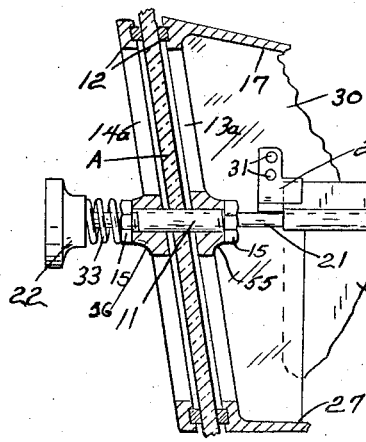
INVENTORS
Francis J. Schmidt Jr. and
Charles J. Nash
BY
Erwin, Wheeler & Woolard
ATTORNEYS

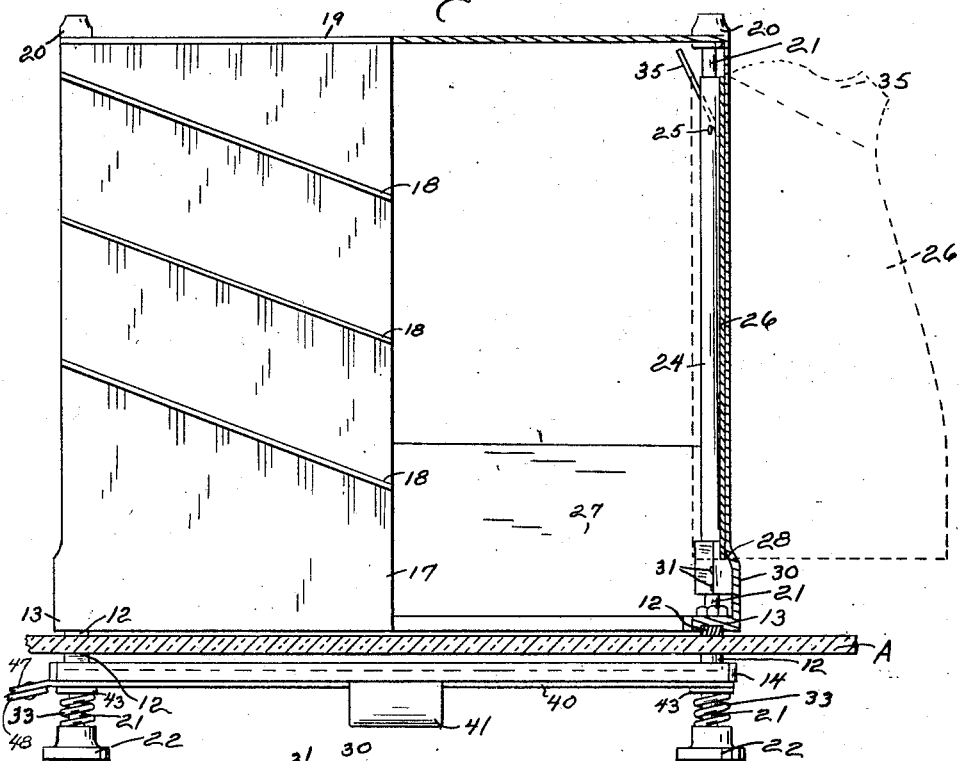

Patented Jan. 10, 1928.

1,655,513

UNITED STATES PATENT OFFICE.

FRANCIS J. SCHMIDT, JR., AND CHARLES J. NASH, OF WAUWATOSA, WISCONSIN.

WINDSHIELD VISOR.

Application filed May 13, 1926. Serial No. 108,788.

This invention relates to improvements in visor attachments for wind shields.

The object of this invention is to provide the glass wind shield of a vehicle with an efficient non-rattling visor for the driver's use which will effectually exclude glare from the lights of an approaching vehicle and reflected glare from the lights of a following vehicle; also, to provide such a visor with adjustable portions operable from the driver's seat, whereby the range of vision, particularly lateral vision, may be increased when the conditions of travel permit and decreased for the purpose of excluding glare, rain or snow.

A further object of this invention is to provide an improved visor with adequate means for clamping the same to the exterior surface of the glass and utilizing it in cooperation with glare excluding screens which are held to the interior surface of the glass by the same clamping means employed for securing the visor in position.

In the drawings:

Figure 1 is a sectional view of the improved visor and shield, drawn generally to a plane exposing one of the clamping bolts.

Figure 2 is a sectional view drawn to a plane indicated by line 2—2 of Figure 1.

Figure 3 is a plan view, partly in horizontal section, on a plane indicated by line 3—3 of Figure 1.

Figure 4 is a detail view (enlarged) showing a fragment of the visor and its adjustable side wing.

Figure 5 is a detail isometric view of the interior non-glare shield.

Figure 6 is a detail view showing a slight structural modification to adapt the invention to inclined wind shields.

Like parts are identified by the same reference characters throughout the several views.

A fragment of the wind shield glass is illustrated in section at A in Figures 1 and 3. Sleeve bushings 11 extend through these apertures to connect a pair of frames to the inner and outer surfaces of the glass. These sleeve bushings extend through the respective side bars 13 and 14 of the frames and are provided at their respective ends with clamping nuts 15. The frames 13 and 14 are provided with rubber cushions 12 which are seated in suitable channels in the frame bars and bear against the wind shield glass. The outer frame 13 constitutes a portion of a visor having a roof portion 17 which is forwardly inclined and also laterally inclined from its longitudinal center line, as best indicated in Figure 3. Upwardly projecting ribs 18 extend obliquely from said longitudinal center line laterally and forwardly to direct water from the roof toward the sides of the visor. The forward margin of the roof is provided with a transverse upstanding flange 19 and depending ears or brackets 20 at the respective corners which have apertures 23 to receive the ends of rods 21 which extend through the respective bushings 11 and are each provided on the inner side of the glass wind shield with an operating knob 22.

Sleeves 24 are secured to the rods 21 by any suitable means, such as the cotter pins 25, and each of these sleeves 24 is secured to a side wing 26, the inner upper corners of which are normally engaged in a slot or notch 28 (Figure 4) in the stop block 29 which is secured to the fixed portion 30 of the side wall by bolts or rivets indicated at 31. The wing 26 is held in the notch under resilient tension derived from the coiled spring 33 interposed between the knob 22 and the clamping nut 15 on the inner end of the sleeve bushing 11. But by pushing the knob forwardly, or in the direction of the wind shield glass, the outer end of the rod 21 will slide in the bearing aperture 23 and the associated wing 26 will be moved forwardly until its inner upper corner is retracted from the notch 28, whereupon the knob 22 may be rotatively adjusted to swing the wing 26 laterally to a substantially horizontal position with its aforesaid corner in registry with a horizontally disposed notch or open slot 28' into which the corner of the wing will be urged by the spring 33 if pressure upon the knob 22 is then relieved. It will be observed in Figure 2 that wings 26 are provided on both sides of the visor and each may be adjusted independently of the other. Each of the wings is preferably provided at its front end with an obliquely inturned extremity 35 to exclude objectionable light rays that might otherwise enter the visor and be reflected from the opposing side wall to the eyes of the driver. A bottom wall 27 will preferably be provided to not only exclude glare from wet pavements but also to exclude the water which might otherwise be splashed from the cowl upwardly against the portion of the wind shield embraced by the visor.

The inner frame 14 supports a vertically sliding shield 40 provided with a hook shaped handle 41, whereby it may be raised or lowered across the upper portion of the space enclosed by the frame 14. The side bars of the frame 14 have their lower portions provided with a series of notches 42 and the shield 40 has depending side arms 43, the lower ends 44 of which are elbowed to form lips and adapted to engage in any one of the notches 42 with which it may be in registry. These depending arms 43 are suitably apertured for the reception of the wing operating rods 21. In the construction shown, the apertured portions of these arms 43 are interposed between the front ends of the springs 33 and the clamping nuts 15 of the sleeve bushings 11. Therefore, the pressure of the springs 33 tends to hold the slide 40 in any position of vertical adjustment in cooperation with the notch engaging lips or flanges at the lower ends of the arms. The material of which the arms and the slide is composed is sufficiently resilient to allow the lips 44 to withdraw from the notch under pressure manually exerted upon the handle 41.

The shields 40 will preferably be formed of celluloid or other translucent material suitably colored to prevent glare and to absorb light coming through the rear window of the car body sufficiently to prevent objectionable reflection into the eyes of the driver. The left hand end of the shield 40 is preferably provided with an inturned obliquely disposed wing 47 and a co-operative adjustable wing 48 hinged to the wing 47 at 49, whereby the wing 48 may be folded upon the wing 47 or swung downwardly at the side of the left hand arm 43 as shown in Figure 5. A stud or embossed projection 50 on the wing 47 may serve to hold the shield 48 in either of its positions of adjustment. If desired, the shield 40 may also be provided with end flanges 51 for guiding engagement with the frame bars 14, which co-act with the rods 21 in guiding the shield 40 for vertical movement.

Referring to Figure 6, it will be observed that the wind shield A' is inclined. Frame bars 13ª and 14ª corresponding with the frame bars 13 and 14, shown in Figure 1, are adapted for clamping engagement with the obliquely disposed glass of the wind shield and are provided with bosses 55 and 56, respectively, the outer surfaces of which are vertically disposed, to receive the clamping nuts 15 which secure the sleeve 11 in position. The fixed side wall portions 30 of the visor will, of course, have correspondingly inclined inner margins, but otherwise the construction will be substantially the same as that described with reference to Figures 1 to 5, inclusive.

Under ordinary conditions, the shield 40 will be raised to allow clear vision through the visor. When so raised, it may be entirely out of the line of vision of the driver or it may be in a line of vision through the space above the visor. When so adjusted during night driving, it will be desirable to swing the wing 48 downwardly to the position in which it is shown in Figure 5 to prevent glare from the lamps of an approaching vehicle from entering the eye of the driver along the left hand side of the visor. Under all other conditions the wing 48 will preferably be swung upwardly and supported on the stud 50 in order to allow clear vision toward the left hand side of the roadway. The left hand wing 26 may be also swung to the position in which it is shown in Figure 2 for the same reason. The right hand wing may be kept in the horizontal position at all times except when it is desired to exclude rain or snow.

We claim:

1. The combination with the wind shield of a vehicle, of a visor therefor, and a set of supporting members extending through the wind shield for clampingly securing the visor thereto, said visor having laterally adjustable side wings, and actuating devices therefor extending through said visor supporting members, whereby the driver of the car may adjust said wings without leaving his seat.

2. The combination with a wind shield of a vehicle, of a visor secured thereto and provided with laterally adjustable side portions, and adjusting connections for said side wall portions extending to the rear of the wind shield and adapted to be operated by the driver of the vehicle.

3. The combination with a vehicle wind shield, of a set of frames having cushioned bearings on the inner and outer surfaces of the shield, and means for connecting said frames through the shield, said frames being provided with glare excluding devices.

4. The combination with a vehicle wind shield, of a set of frames having cushioned bearings on the inner and outer surfaces of the shield, means for connecting said frames through the shield, said frames being provided with glare excluding devices, and having means for adjusting such devices by a person occupying the driver's seat.

5. The combination of a vehicle wind shield provided with bolt apertures, a visor having side portions in registry with said apertures and secured to the shield by tubular clamping bolts extending through said apertures, said visor being also provided with tubular side bars having laterally adjustable wings, and wing adjusting connections extending through said side bars and clamping bolts to the space in the rear of the wind shield.

6. The combination with a vehicle wind shield, of a visor having apertured side bars, and clamping connections extending through said apertures and through the wind shield, said visor including adjustable side wings and actuating connections extending through the clamping connections to the space in the rear of the wind shield.

7. The combination with a vehicle wind shield, provided with apertures therein, of a visor clamped to the wind shield by a set of bushings extending through said apertures, movable side wings for said visor, rods extending through said bushings and connected with said side wings, and slotted brackets in which marginal portions of the side wings may be engaged in a plurality of positions of adjustment.

8. The combination with a vehicle wind shield, provided with apertures therein, of a visor clamped to the wind shield by a set of bushings extending through said apertures, movable side wings for said visor, rods extending through said bushings and connected with said side wings, and slotted brackets in which marginal portions of the side wings may be engaged in a plurality of positions of adjustment, each of said rods being provided with an operating piece and a spring interposed between said operating piece and the associated bushing for urging the rod to a position with its wing in pressure engagement with its bracket.

9. The combination with a vehicle wind shield, of a cushioned frame applied to its inner surface and provided with an adjustable glare excluding slide, another cushioned frame applied to its outer surface and provided with forwardly projecting visor walls, and means extending through the wind shield and clampingly connecting said frames thereto.

10. The combination with a vehicle wind shield, of a cushioned frame applied to its inner surface and provided with an adjustable glare excluding slide, another cushioned frame applied to its outer surface and provided with forwardly projecting visor walls, and means extending through the wind shield and clampingly connecting said frames thereto, said glare excluding slide being adjustable into and out of the line of the driver's vision.

11. The combination with a vehicle wind shield, of a cushioned frame applied to its inner surface and provided with an adjustable glare excluding slide, another cushioned frame applied to its outer surface and provided with forwardly projecting visor walls, means extending through the wind shield and clampingly connecting said frames thereto, said glare excluding slide being adjustable into and out of the line of the driver's vision, and having an obliquely extending member formed in adjustable sections.

12. The combination with a vehicle wind shield, of a cushioned frame applied to its inner surface and provided with an adjustable glare excluding slide, another cushioned frame applied to its outer surface and provided with forwardly projecting visor walls, means extending through the wind shield and clampingly connecting said frames thereto, said glare excluding slide being adjustable into and out of the line of the driver's vision, and having an obliquely extending member formed in adjustable sections, said slide also having depending arms adapted for interlocking engagement with the associated frame member.

13. The combination with a vehicle wind shield, of a visor secured to the front face thereof, and a co-operative glare excluding screen vertically adjustable upon the inner face of the shield across the sight opening of the visor and provided with an obliquely disposed wing at one end extending laterally and inwardly from the portion of the shield engaged by the visor in a position to prevent rays of light from reaching the eyes of the driver from an approaching vehicle through space exterior to the visor.

14. The combination with a vehicle wind shield, of a visor secured to the front face thereof, and a co-operative glare excluding screen vertically adjustable upon the inner face of the shield across the sight opening of the visor and provided with an obliquely disposed wing at one end extending laterally and inwardly from the portion of the shield engaged by the visor in a position to prevent rays of light from reaching the eyes of the driver from an approaching vehicle through space exterior to the visor, said obliquely extending portion of the screen being formed in two sections pivotally connected and relatively adjustable one upon the other.

15. The combination with a vehicle wind shield, of a visor covering a portion of the front face of the shield and bolted thereto, a glare excluding screen adjustable to the inner face of the shield and having supporting members provided with vertically extending slots through which the visor bolts extend in clamping relation thereto, whereby said screen may be adjusted vertically by loosening said clamping bolts.

16. In an anti-glare attachment for wind shields, a glare excluding screen, and means for adjustably securing said screen to the inner face of the wind shield, said screen having an obliquely disposed wing at its left hand end pitched inwardly from the body of the shield, said wing having a pivoted extension adapted to be either swung to a downwardly extending position or folded upwardly upon the other portion of the wing.

17. The combination with a vehicle wind shield, of a visor having a side wall portion pivotally connected with the body of the visor along its upper margin and also movable along said pivotal axis, means for resiliently moving said side wall portion along said axis in one direction, an operating rod for manually moving it in the other direction, and locking devices for preventing movement of said side wall portion except when manually adjusted axially in opposition to the resilient pressure.

18. The combination with a vehicle wind shield, of a visor having a side wall portion pivotally supporting for lateral swinging movements, means for manually adjusting said wall portion from the opposite side of the wind shield, and means for interlocking said wall portion in its adjusted position under resilient pressure when manually released.

19. The combination with a vehicle wind shield, of a visor having a laterally movable side wall portion, means for locking said wall portion, and a manually operable adjusting device extending through the wind shield and adapted to permit manual reciprocation interlocking and rotative adjusting operations by the driver of the vehicle.

20. The combination with a wind shield visor having a fixed side wall portion and a swinging side wall portion adapted to be normally interlocked with the fixed portion at one end in various positions of adjustment, a spring adapted to normally hold the swinging wall portion in any one of the different positions of interlocking engagement, and an operating piece for moving the wall portion along the axis of its swinging movement and against the pressure of the spring for releasing and adjusting it to a different position.

21. In an anti-glare attachment for wind shields, a visor secured to the front face of the shield and having an adjustable glare excluding side wall portion, a glare excluding translucent screen adjustably mounted on the inner face of said shield, means extending through the shield and adapted to secure both the visor and the screen thereto, and provided with means for permitting an adjustment of either the screen or said side wall portion by the driver while driving the vehicle.

22. In an anti-glare attachment for transparent vehicle wind shields, the combination with such wind shield of a rotative rod extending through said shield, and a pivotally mounted wing supported in a plane substantially perpendicular to the wind shield and parallel to the axis of the rod and adapted to be swung by said rod upon an axis also substantially perpendicular to the outer face of said shield toward and from a vertical plane, said rod having an actuating piece at its inner end accessible to the driver of the vehicle.

23. An anti-glare attachment for transparent vehicle windshields, comprising the combination with such a shield, of a visor secured to the front face thereof and provided with a forwardly and downwardly inclined top wall, a side wall portion having a lower margin in a line substantially perpendicular to the outer face of the shield cooperative with a movable side wall portion disposed as an extension of the first mentioned portion and adapted to be adjusted to either laterally enlarge or constrict the field of vision through the space underneath said top wall, and an actuating rod extending through the wind shield and provided with an operating piece at its inner end.

FRANCIS J. SCHMIDT, Jr.
CHARLES J. NASH.